United States Patent
Nakano et al.

(10) Patent No.: US 12,107,902 B2
(45) Date of Patent: Oct. 1, 2024

(54) SERVER SYSTEM AND REDUNDANCY METHOD FOR PROCESSES

(71) Applicant: ICOM INCORPORATED, Osaka (JP)

(72) Inventors: Akira Nakano, Osaka (JP); Yoshiaki Miyakoshi, Osaka (JP)

(73) Assignee: ICOM INCORPORATED, Osaka (JP)

( * ) Notice: Subject to any disclaimer, the term of this patent is extended or adjusted under 35 U.S.C. 154(b) by 346 days.

(21) Appl. No.: 17/438,450

(22) PCT Filed: Jan. 23, 2020

(86) PCT No.: PCT/JP2020/002323
§ 371 (c)(1),
(2) Date: Sep. 12, 2021

(87) PCT Pub. No.: WO2020/189002
PCT Pub. Date: Sep. 24, 2020

(65) Prior Publication Data
US 2022/0166806 A1 May 26, 2022

(30) Foreign Application Priority Data
Mar. 15, 2019 (JP) ................................. 2019-048649

(51) Int. Cl.
*H04L 65/1046* (2022.01)
*H04L 67/10* (2022.01)

(52) U.S. Cl.
CPC .......... *H04L 65/1046* (2013.01); *H04L 67/10* (2013.01)

(58) Field of Classification Search
CPC ................................................ H04L 65/1046
(Continued)

(56) References Cited

U.S. PATENT DOCUMENTS 5,852,724 A * 12/1998 Glenn, II ............ G06F 11/3006
714/6.32
5,974,114 A * 10/1999 Blum .................. G06F 11/2038
714/17
(Continued)

FOREIGN PATENT DOCUMENTS

CN 101227319 A 7/2008
CN 103179184 A 6/2013
(Continued)

OTHER PUBLICATIONS

The extended European search report of the corresponding EP application No. 20774807.0 mailed Nov. 10, 2022.
(Continued)

*Primary Examiner* — Ahmad F. Matar
*Assistant Examiner* — Jirapon Tulop
(74) *Attorney, Agent, or Firm* — Muncy, Geissler, Olds & Lowe, P.C.

(57) ABSTRACT

A server system including a plurality of servers achieves redundancy on a per process basis. A first server and a second server execute a plurality of processes in parallel. Processes (B1-1, B2-1, and Br-1) in the first server are active processes, and processes (B1-2, B2-2, and Br-2) in the second server are standby processes. The active process periodically transmits an operation notification notifying normal operation, to the standby process. When no longer receiving an operation notification from the active process, the standby process switches an operation mode of the standby process from a standby mode to an active mode and starts provision of service of the process. The process switching is performed on a per process basis instead of on a per server basis.

10 Claims, 29 Drawing Sheets

(58) Field of Classification Search
USPC .......................................................... 370/259
See application file for complete search history.

(56) References Cited

U.S. PATENT DOCUMENTS

| | | | | |
|---|---|---|---|---|
| 5,978,933 | A * | 11/1999 | Wyld | G06F 11/1482 |
| | | | | 714/E11.073 |
| 7,912,075 | B1 * | 3/2011 | Holland | H04L 65/80 |
| | | | | 370/216 |
| 8,675,851 | B1 * | 3/2014 | Karp | H04L 65/1046 |
| | | | | 379/230 |
| 2008/0183991 | A1 * | 7/2008 | Cosmadopoulos | H04L 67/142 |
| | | | | 711/E12.103 |
| 2008/0215714 | A1 | 9/2008 | Shimmura et al. | |
| 2010/0042715 | A1 | 2/2010 | Tham et al. | |
| 2010/0083031 | A1 | 4/2010 | Koike et al. | |
| 2011/0075654 | A1 | 3/2011 | Joachimpillai et al. | |
| 2013/0159491 | A1 | 6/2013 | Hara | |
| 2017/0019320 | A1 | 1/2017 | Takaochi et al. | |

FOREIGN PATENT DOCUMENTS

| | | |
|---|---|---|
| CN | 103384212 A | 11/2013 |
| CN | 103931139 A | 7/2014 |
| IN | 101610188 A | 12/2009 |
| JP | 2006-172050 A | 6/2006 |
| JP | 2010-086137 A | 4/2010 |
| JP | 2013-077983 A | 4/2013 |
| JP | 2013161266 A | 8/2013 |
| JP | 2017-027110 A | 2/2017 |
| KR | 20020062483 A | 7/2002 |

OTHER PUBLICATIONS

Office Action of the corresponding JP application No. 2019-048649 mailed Jul. 11, 2023 and English translation thereof.
First office action of the corresponding CN application No. 202080018456.4 mailed Jul. 29, 2022.

* cited by examiner

Fig. 7A

| PROCESS UNDER EXECUTION | B2-1 |
|---|---|
| OPERATION SETTING | main |
| OPERATION MODE | active |
| OPERATION NOTIFICATION EXPIRATION DATE AND TIME | 2019.2.18. ..** |
| ACTIVE PROCESS OPERATION NOTIFICATION EXPIRATION DATE AND TIME | — |

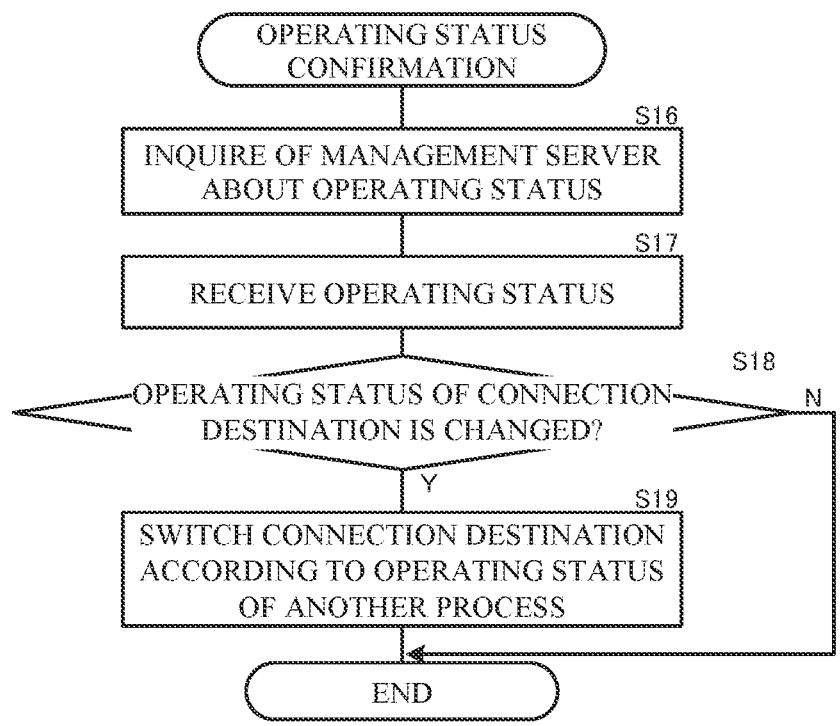

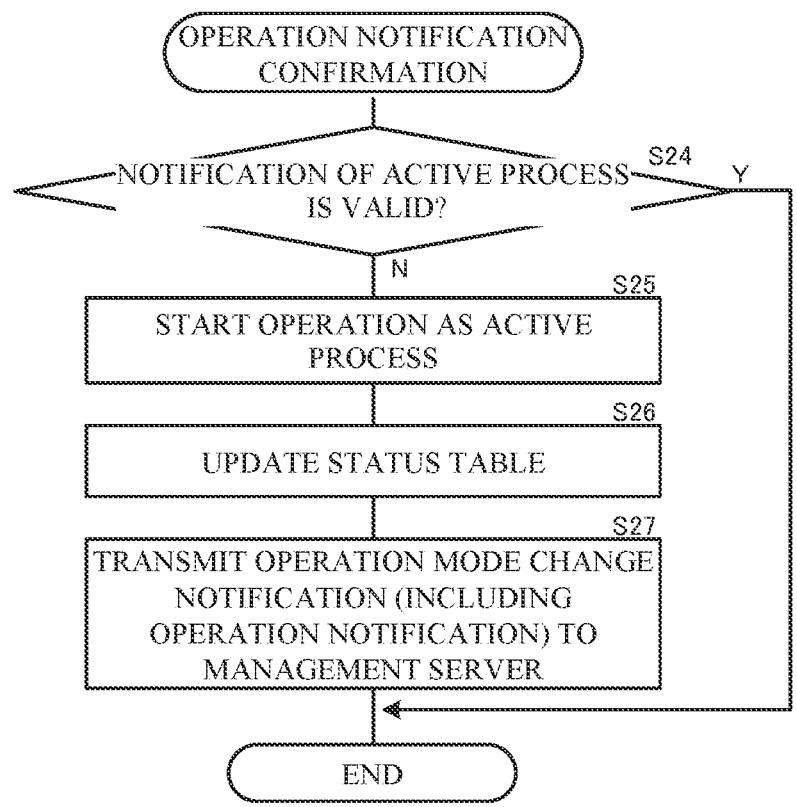

| CALL CONTROL SERVER 1 PROCESS NAME | OPERATION NOTIFICATION EXPIRATION DATE AND TIME | OPERATION SETTING | OPERATION MODE |
|---|---|---|---|
| A-1 | 2019.2.18. ** ** ** | main | active |
| B1-1 | 2019.2.18. ** ** ** | main | active |
| B2-1 | 2019.2.18. ** ** ** | main | active |
| C-1 | 2019.2.18. ** ** ** | alone | active |
| idle | — | — | idle |
| Br-1 | 2019.2.18. ** ** ** | main | active |

| CALL CONTROL SERVER 2 PROCESS NAME | OPERATION NOTIFICATION EXPIRATION DATE AND TIME | OPERATION SETTING | OPERATION MODE |
|---|---|---|---|
| A-2 | 2019.2.18. ** ** ** | sub | standby |
| B1-2 | 2019.2.18. ** ** ** | sub | standby |
| B2-2 | 2019.2.18. ** ** ** | sub | standby |
| idle | — | — | idle |
| idle | — | — | idle |
| Br-2 | 2019.2.18. ** ** ** | sub | standby |

Fig. 11A

| CALL CONTROL SERVER 1 | OPERATION MODE | OPERATION MODE | CALL CONTROL SERVER 2 |
|---|---|---|---|
| A-1 | active | standby | A-2 |
| B1-1 | active | standby | B1-2 |
| B2-1 | down | active | B2-2 |
| C-1 | active | idle | idle |
| idle | idle | idle | idle |
| Br-1 | active | standby | Br-2 |

Fig. 11B

| CALL CONTROL SERVER 1 | OPERATION MODE |
|---|---|
| A-1 | active |
| B1-1 | active |
| B2-1 | active |
| C-1 | active |
| idle | idle |
| Br-1 | down |

| OPERATION MODE | CALL CONTROL SERVER 2 |
|---|---|
| standby | A-2 |
| standby | B1-2 |
| standby | B2-2 |
| idle | idle |
| idle | idle |
| active | Br-2 |

Fig. 12

| MAIN PROVISIONING SERVER ADDRESS | ACTIVE FLAG |
| SUB-PROVISIONING SERVER ADDRESS | ACTIVE FLAG |
| MAIN CALL CONTROL SERVER ADDRESS | ACTIVE FLAG |
| SUB-CALL CONTROL SERVER ADDRESS | ACTIVE FLAG |
| VARIOUS TYPES OF SETTING INFORMATION | |

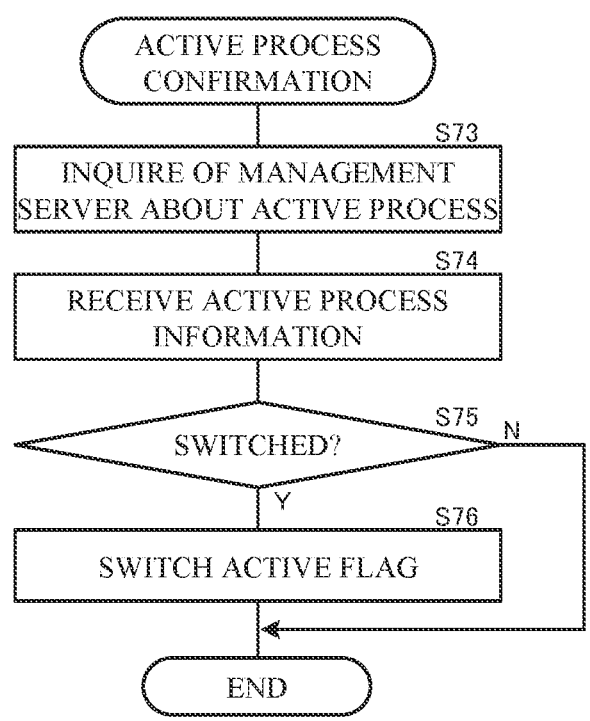

Fig. 15A (A): MANAGEMENT SERVER 1

| CALL CONTROL SERVER 1 | OPERATION MODE | OPERATION MODE | CALL CONTROL SERVER 2 |
|---|---|---|---|
| A-1 | active | down | A-2 |
| B1-1 | active | down | B1-2 |
| B2-1 | active | down | B2-2 |
| C-1 | active | idle | idle |
| idle | idle | idle | idle |
| Br-1 | active | down | Br-2 |

Fig. 15B

(B): MANAGEMENT SERVER 2

| CALL CONTROL SERVER 1 | OPERATION MODE | OPERATION MODE | CALL CONTROL SERVER 2 |
|---|---|---|---|
| A-1 | down | active | A-2 |
| B1-1 | down | active | B1-2 |
| B2-1 | down | active | B2-2 |
| C-1 | down | idle | idle |
| idle | idle | idle | idle |
| Br-1 | down | active | Br-2 |

SERVER SYSTEM AND REDUNDANCY METHOD FOR PROCESSES

TECHNICAL FIELD

The present disclosure relates to providing redundancy for a server system.

BACKGROUND ART

Providing redundancy for a server system by installing an active server and a standby server, and synchronizing the active server and the standby server is previously known. When a server system is configured with redundancy, communication with a terminal device is performed by, for example, virtual IP using a protocol such as VRRP (see Patent Literature 1).

CITATION LIST

Patent Literature

Patent Literature 1: Unexamined Japanese Patent Application Publication No. 2013-077983

SUMMARY OF INVENTION

Technical Problem

In order to use VRRP, both an active server and a standby server need to be installed on the same network segment. In a case of a plurality of processes being executed by the servers in a server system provided with redundancy in this topology, every process needs to be switched from the active server to the standby server even when a failure occurs in part of the processes.

In VRRP, the active server transmits an advertisement to the standby server at fixed time intervals in order to notify that the active server is operating normally. On the other hand, an advertisement is not transmitted in the opposite direction, in other words, from the standby server to the active server, and therefore the active server cannot recognize a state of another server in the system.

An objective of the present disclosure is to enable redundancy of a server on a per process basis and enable a process to readily recognize an operating status of another process when interprocess communication or the like is performed.

Solution to Problem

The present disclosure includes a first server and a second server that are installed on a communication network. The first server executes a plurality of processes, and the second server executes, in parallel, at least part of the plurality of processes executed by the first server. Among the processes executed in parallel by the first server and the second server, one process (active process) operates in an active mode for actual providing service, and another process (standby process) operates in a standby mode that, when the one process in the active mode goes down, becomes the active mode in place of the one process in the active mode. An active process periodically transmits an operation notification being a message notifying that the active process is operating normally, to a standby process. The standby process continues the standby mode while periodically receiving the operation notification from the active process and when no longer receiving the operation notification from the active process, switches an operation mode of the standby process from the standby mode to the active mode and starts provision of the service of the process.

According to the present disclosure, a process is executed in parallel by the first server and the second server; and one is set as an active process and the other is set as a standby process. When part of processes goes down due to a failure, switching is made on a per failed process basis rather than on the entire server. Consequently, switching processing in a redundant configuration is simplified, and even when part of processes goes down in both the first and second servers, the system as a whole is operational as long as the process normally operates in the counterpart server; and therefore robustness is further increased.

For example, a first network and a second network that are separate mobile phone carrier networks may be used as communication networks; and the first server may be provided on the first network, and the second server may be provided on the second network. In this case, the first server is connected to the second server by a VPN using a dedicated line, or the like. Thus, by installing the first server and the second server on separate networks, a system tolerant of network failures can be configured.

A management server including a management table storing operating status of each process may be further provided on the communication network. Each process executed by the first and second servers periodically transmits the operation notification to the management server. Further, when an operation mode of a process switches from the standby mode to the active mode, the process transmits a mode switch notification to the management server. The management server stores operating status of each process acquired by the operation notification and the mode switch notification into the management table.

By referring to contents of the management table, that is, operating status of each process, a process can recognize operating status of another process even when a notification is not sent to the process, and even when active/standby (main/sub-) status is switched on a per process basis, the process can maintain interprocess communication by responding to the switching.

For example, when a first process executes interprocess communication with a process (second process) executed by the first server and the second server in parallel, the first process inquires of the management server about operating status of each process, determines a process operating in the active mode out of the second processes executed in parallel by the two servers, based on the acquired operating status of each process, and determines the operating second process to be a communication counterpart in the interprocess communication.

For example, a first network and a second network that are separate mobile phone carrier networks may be used as communication networks; and the first server and a first management server may be provided on the first network, and the second server and a second management server may be provided on the second network. In this case, a first server system (the first server and the first management server) is connected to a second server system (the second server and the second management server) by a VPN using a dedicated line, or the like.

Each process executed by the first and the second servers transmits the operation notification and a mode switch notification to both the first management server and the second management server. Consequently, redundancy can be provided for the management servers. A process may inquire of a management server in a network on the same side as the process about operating status of each process.

A process executed by the first server and the second server may be a call control process relaying voice signals transmitted from a plurality of communication terminals. Out of the plurality of communication terminals, a communication terminal set with a SIM for the first network accesses a server through the first network. A communication terminal set with a SIM for the second network accesses a server through the second network. Access from the first network to the second server is performed through the VPN connecting the servers.

Advantageous Effects of Invention

The present disclosure can construct a redundant configuration on a per process basis when a plurality of processes is executed by first and second servers and can achieve easier server (process) switching and higher robustness.

BRIEF DESCRIPTION OF DRAWINGS

FIG. 7A is a diagram illustrating a status table provided in a main process;

FIG. 8B is a flowchart illustrating an operation of the call control server;

FIG. 8D is a flowchart illustrating an operation of the call control server;

FIG. 9 is a diagram illustrating a management table 310 provided in a management server;

FIG. 11A is a diagram describing stored contents of the management table when part of the processes goes down;

FIG. 11B is a diagram describing stored contents of the management table when part of the processes goes down;

FIG. 12 is a diagram illustrating an example of provisioning data set to the communication terminal;

FIG. 13C is a flowchart illustrating an operation of the communication terminal;

FIG. 15A is a diagram describing stored contents of a first management table when the VPN connecting the server systems goes down; and FIG. 15B is a diagram describing stored contents of a second management table when the VPN connecting the server systems goes down.

DESCRIPTION OF EMBODIMENTS

Figure 1:
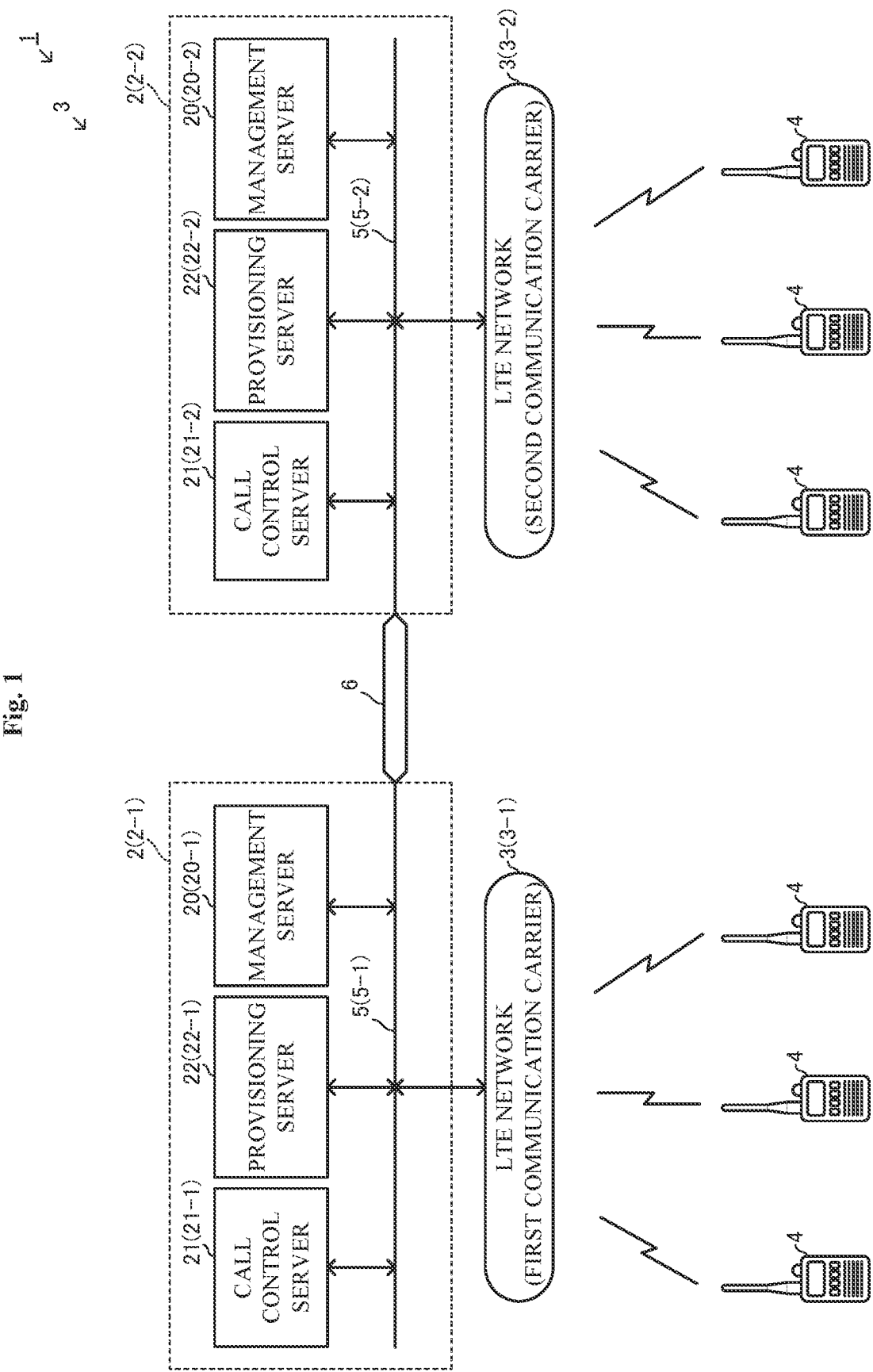
FIG. 1 is a configuration diagram of a voice communication system according to an embodiment of the present disclosure.

FIG. 1 is a diagram illustrating a configuration of a voice communication system 1 according to an embodiment of the present disclosure. The voice communication system 1 includes a plurality of (two in the present embodiment) server systems 2 (2-1 and 2-2) and a plurality of communication terminals 4. The server systems 2 and the communication terminals 4 are interconnected by a plurality of (two in the present embodiment) LTE networks 3 (3-1 and 3-2). The two LTE networks 3-1 and 3-2 are communication networks respectively provided by different communication carriers (mobile phone operators).

The server system 2-1 is installed on the LTE network 3-1 (first communication carrier) as a cloud server, and the server system 2-2 is installed on the LTE network 3-2 (second communication carrier) as a cloud server. The server systems 2-1 and 2-2 are connected by a VPN 6 using a dedicated line provided by the communication carriers.

A communication terminal accessing the server system 2 through the LTE network 3-1 out of the communication terminals 4 is equipped with a SIM card for the first communication carrier. A communication terminal accessing the server system 2 through the LTE network 3-2 is equipped with a SIM card for the second communication carrier.

The server system 2-1 includes a call control server 21-1, a provisioning server 22-1, and a management server 20-1. The server system 2-2 similarly includes a call control server 21-2, a provisioning server 22-2, and a management server 20-2. The call control server 21-1, the provisioning server 22-1, the management server 20-1, and the LTE network 3-1 are interconnected by a local area network (LAN) 5-1. The call control server 21-2, the provisioning server 22-2, the management server 20-2, and the LTE network 3-2 are interconnected by the LAN 5-2. The LAN 5-1 and the LAN 5-2 are interconnected by the VPN 6. The VPN 6 corresponds to a communication line according to the present disclosure.

The server system 2-1 and the server system 2-2 are respectively on clouds of communication carriers different from each other and can be installed at geographically distant locations and therefore allow construction of a fault-tolerant and robust voice communication system. The server system 2-1 and the server system 2-2 are connected by the VPN 6 being a dedicated line and therefore allow flexible process redundancy as described below, similarly to a case of being on the same network.

Figure 4:
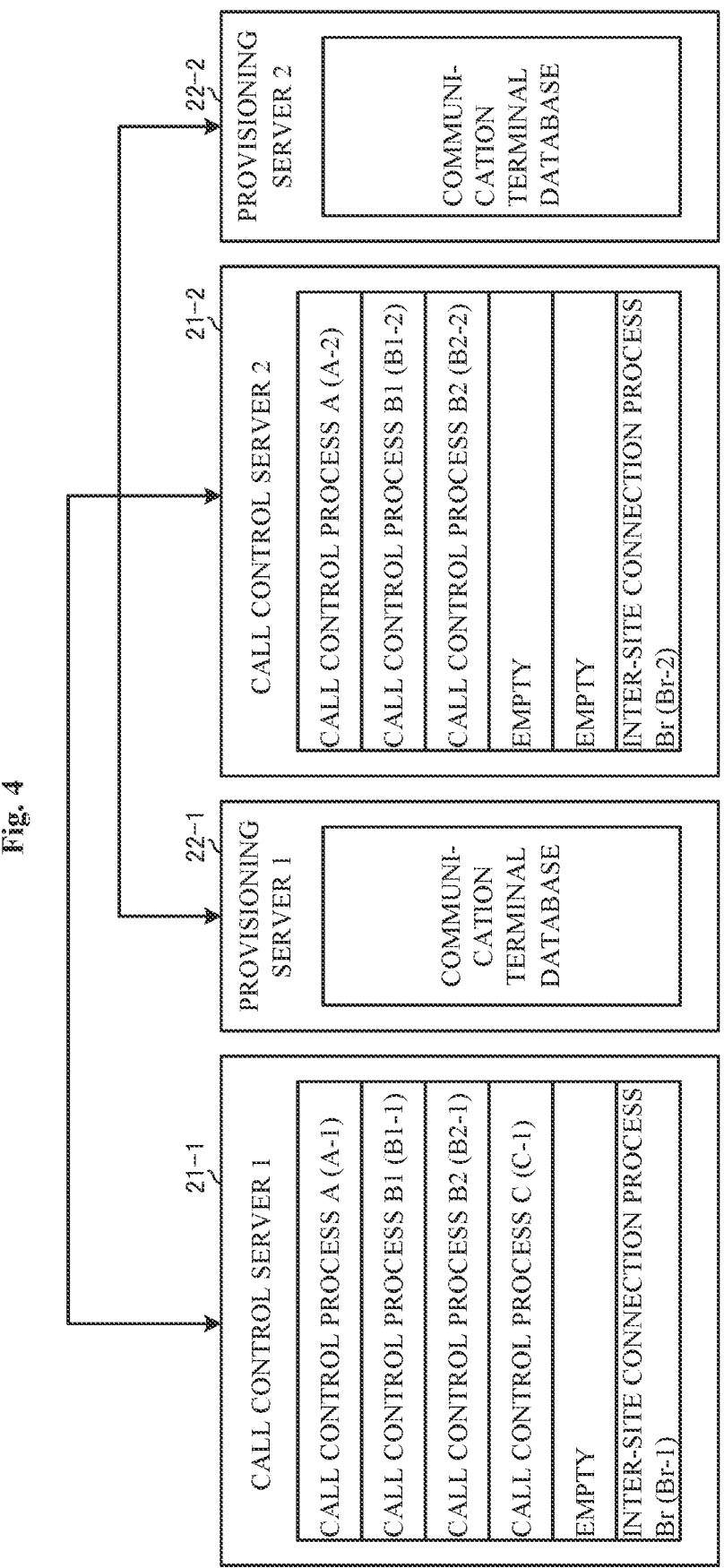
FIG. 4 is a diagram illustrating partitions in a call control server and a provisioning server, and a process (virtual server) executed in each partition.

During normal operation, the call control server 21-1 and the provisioning server 22-1 in the server system 2-1 execute provisioning and call control on communication terminals 4 as main servers. The call control server 21-2 and the provisioning server 22-2 in the server system 2-2 are on standby as sub-servers in preparation for a case of the main servers going down. Note that main/sub switching is made on a per process basis with respect to a plurality of internally started processes rather than on a hardware basis. For example, the plurality of processes is structured as illustrated in FIG. 4, and each process functions as a virtual server.

The management servers 20 (20-1 and 20-2) manage operating status of each process executed by the call control servers 21-1 and 21-2 and the provisioning servers 22-1 and 22-2 in the server systems 2-1 and 2-2 and provide information about the operating status for a server or a communication terminal 4 as requested. Each management server 20 includes a management table 310 as illustrated in FIG. 9.

When a communication terminal 4 (calling terminal) communicates with another communication terminal 4 (called terminal), the calling terminal transmits a voice signal including identification information of the called terminal as control information to the call control server 21. The call control server 21 transfers the voice signal to the called terminal through the LTE network 3. Consequently, voice communication between the calling terminal and the called terminal through the network can be performed without an advance calling procedure such as the SIP protocol (by an operation such as that in a common wireless transceiver). The communication method is described in detail in International Publication No. WO 2015/068663.

Figure 2:
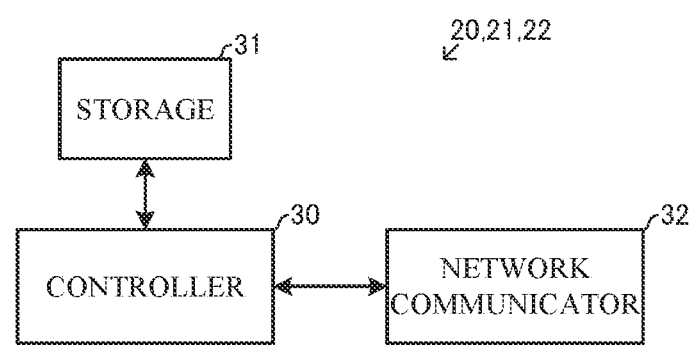
FIG. 2 is a block diagram of a server in the voice communication system.
Figure 7B:
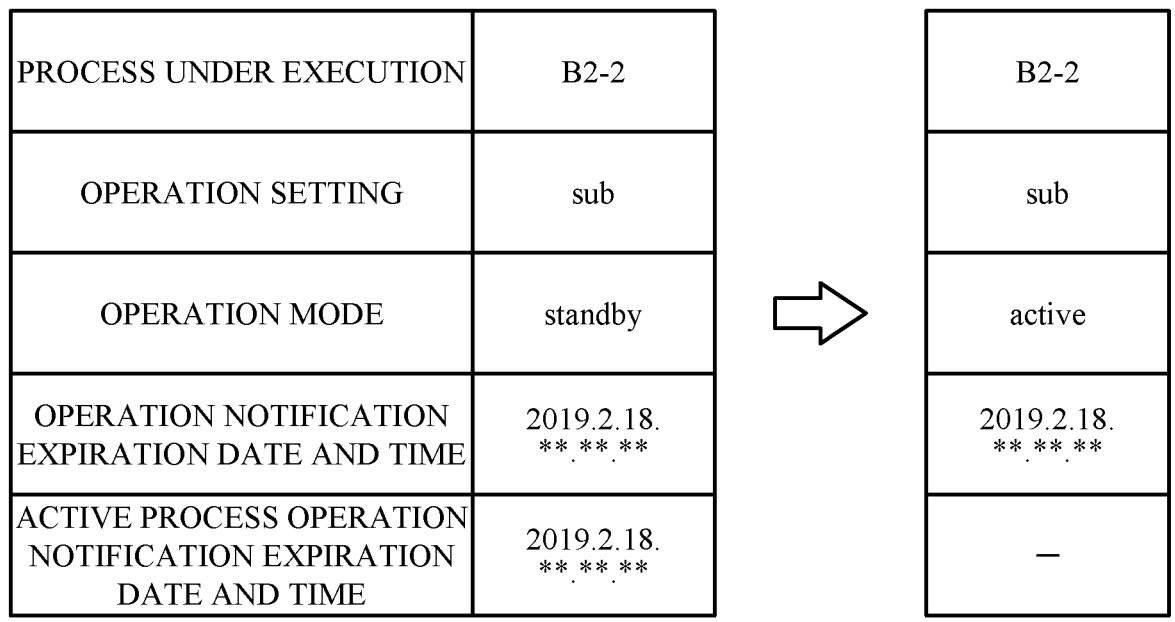
FIG. 7B is a diagram illustrating a status table provided in a sub-process.

FIG. 2 is a block diagram of each of the management servers 20 (20-1 and 20-2), the call control servers 21 (21-1 and 21-2), and the provisioning servers 22 (22-1 and 22-2). A server includes a controller 30, a storage 31, and a network communicator 32. For example, the storage 31 is configured with a hard disk and a RAM. In the case of the management server 20, the management table 310 as illustrated in FIG. 9 is stored in the storage 31. In the case of the call control server 21, a status table as illustrated in FIGS. 7A and 7B is provided in the storage 31. The network communicator 32 communicates with a communication terminal 4 and another server through the LAN 5 and the LTE network 3. The controller 30 controls an operation of each server.

Figure 3:
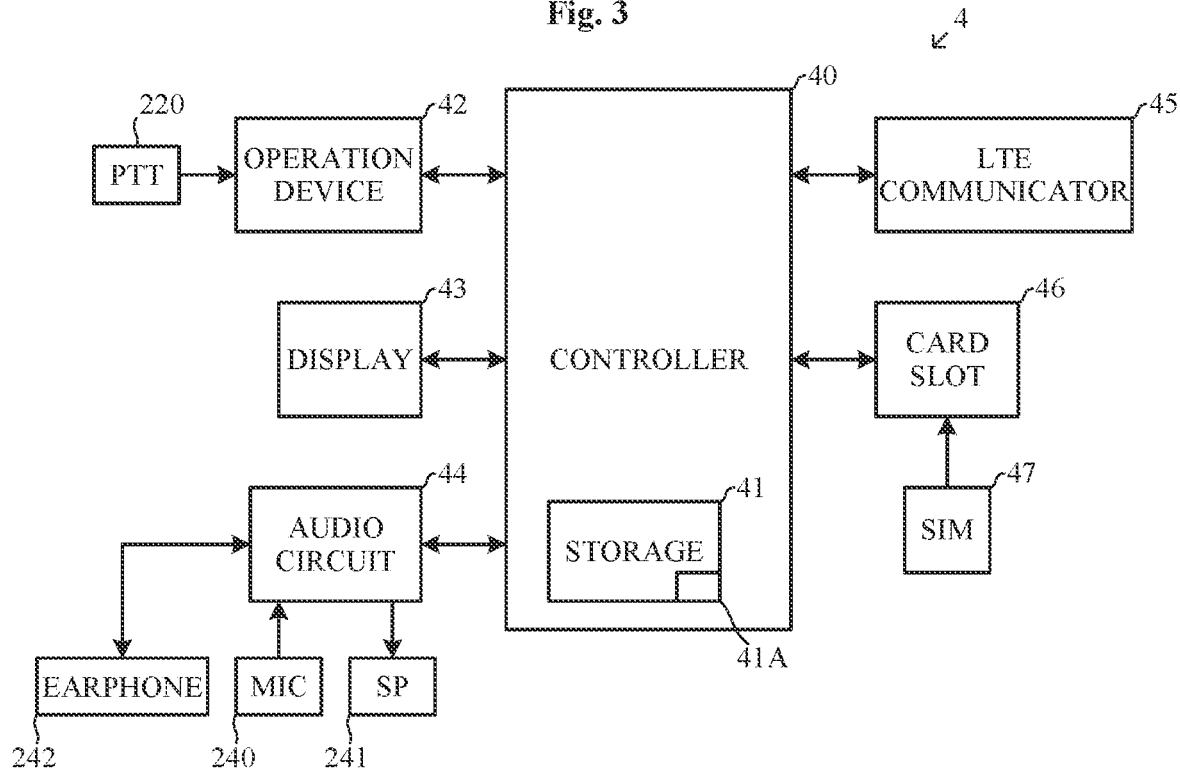
FIG. 3 is a block diagram of a communication terminal.

FIG. 3 is a block diagram of the communication terminal 4. The communication terminal 4 has an appearance of a handy transceiver as illustrated in FIG. 1 but is functionally a piece of wireless network equipment transmitting and receiving voice signals through the LTE network 3. A controller 40 controlling an operation of the device is configured with a microprocessor. The controller 40 includes a storage 41 in which various types of data are stored. The storage 41 includes a provisioning data storage area 41A. Provisioning data as illustrated in FIG. 12 are stored in the provisioning data storage area 41A. The controller 40 is connected to an operation device 42, a display 43, an audio circuit 44, an LTE communicator 45, and a card slot 46. The operation device 42 includes a key switch such as a PTT switch 220, receives a user operation, and inputs the operation signal to the controller 40. The display 43 includes a liquid crystal display. The liquid crystal display displays an identification number of a communication counterpart selected by the user operation, an identification number of a communication counterpart placing a call, and the like.

The audio circuit 44 includes a microphone 240 and a speaker 241. The controller 40 decodes a received voice signal and inputs the decoded signal to the audio circuit 44. The audio circuit 44 converts the decoded audio signal into an analog signal and outputs the analog signal from the speaker 241. The audio circuit 44 also converts a voice signal input from the microphone 240 into a digital signal and inputs the digital signal to the controller 40. The controller 40 voice-packetizes the digital audio signal and inputs the packetized signal to the LTE communicator 45. The LTE communicator 45 includes a circuit performing wireless communication by an LTE communication method. The LTE communicator 45 transmits a packet input from the controller 40 toward the LTE network 3 and inputs a packet received from the LTE network 3 to the controller 40. The audio circuit 44 is provided with an earphone connector 242. When an earphone-microphone (unillustrated) is connected to the earphone connector 242, the audio circuit 44 stops functions of the microphone 240 and the speaker 241 provided on the main body of the communication terminal 4 and enables a microphone and speaker (earphone) in the earphone-microphone. An IC card (SIM card) 47 storing terminal identification information is set to the card slot 46. A SIM card 47 for the first communication carrier is set to a communication terminal 4 used in the LTE network 3-1, and a SIM card 47 for the second communication carrier is set to a communication terminal 4 used in the LTE network 3-2. The terminal identification information (ICCID) stored in the SIM card 47 is used as identification information of each communication terminal 4.

When a user inputs voice toward the microphone 240 while pressing the PTT switch 220 at a communication terminal 4 with the configuration described above, the communication terminal 4 edits the voice signal into a voice packet in which preset identification information of the called terminal is written and transmits the voice packet to the call control server 21 through the LTE network 3.

Figure 5:
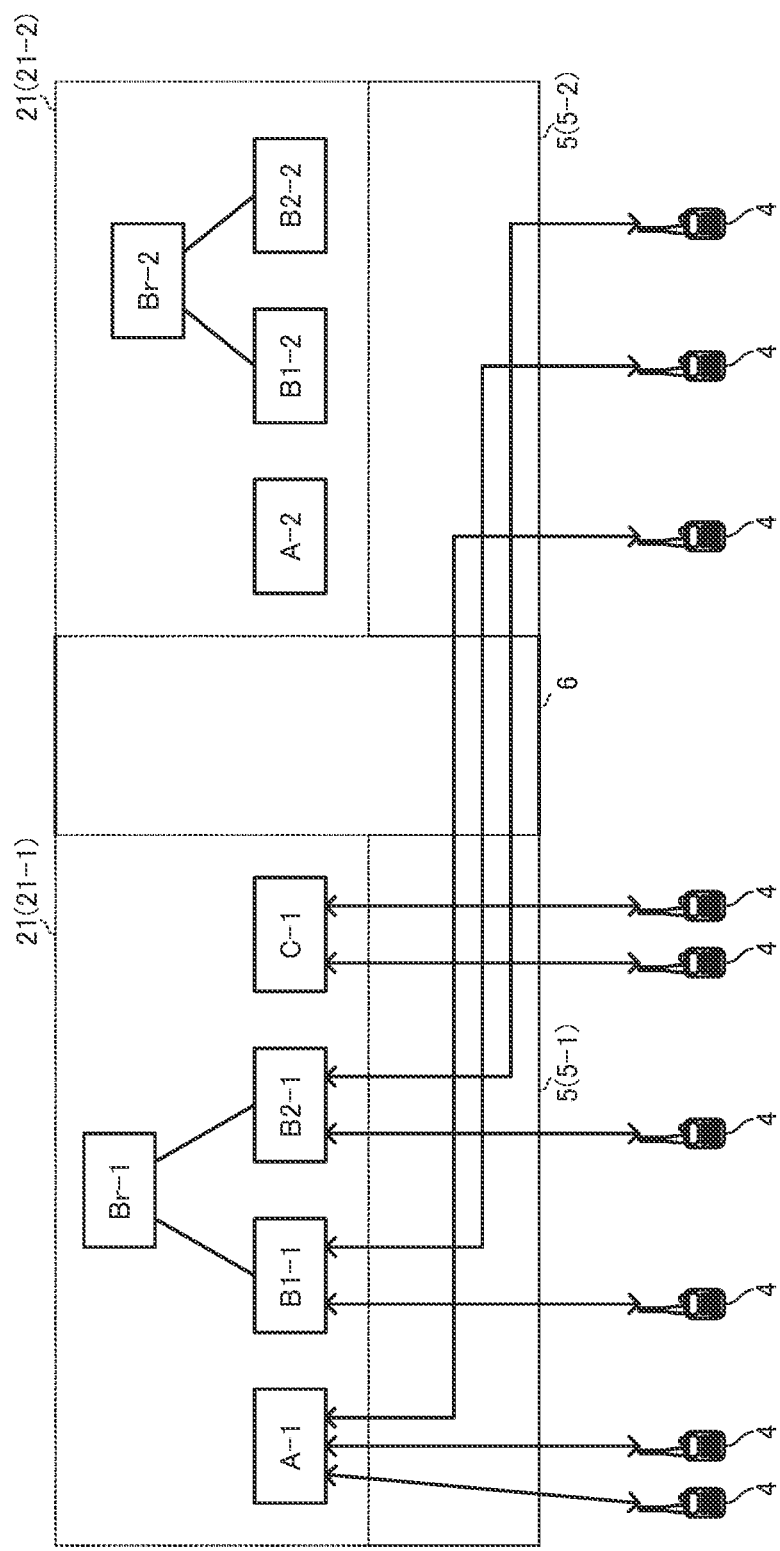
FIG. 5 is a diagram illustrating a topology between processes and communication terminals when every process is operating normally.

FIG. 4 and FIG. 5 are diagrams illustrating a redundant configuration of the call control servers 21 and the provisioning servers 22. FIG. 4 is a diagram illustrating redundancy by the call control servers 21 and the provisioning servers 22, and partition configurations of the controllers 30 in the call control servers 21; and FIG. 5 is a diagram illustrating a function of each process executed by the call control servers 21. The call control server 21 executes a plurality of mutually independent processes (virtual servers) in such a way as to be able to provide independent communication services for a plurality of clients. For example, a client is a business operator using the voice communication system 1. As illustrated in FIG. 4, the call control server 21 is divided into six partitions and executes mutually different processes in the respective partitions. While the provisioning server 22 is common to a plurality of clients, the provisioning server 22 executes mutually different types of provisioning processing, based on a unique identification number of a communication terminal 4 of each client.

Processes executed in the partitions in the call control server 21-1 are call control processes A, B, and C for controlling voice communications by clients A, B, and C, as illustrated in FIG. 5. Processes executed in the partitions in the call control server 21-2 are the call control processes A and B for controlling voice communications by the clients A and B, as illustrated in FIG. 5. In other words, the call control processes A and B for the clients A and B are provided with redundancy but the call control process C for the client C is not provided with redundancy.

The call control process A is a process for relaying voice communications between communication terminals 4 of the client A. The call control process C is a process for relaying voice communications between communication terminals 4 of the client C. One call control process can accommodate up to a predetermined number (such as 100) of communication terminals 4. "Accommodating a communication terminal 4" refers to registering the communication terminal 4 in a memory and performing relaying of voice communications and transmission of provisioning data for the communication terminal 4. When accommodating more than the predetermined number of communication terminals 4, the call control server 21 executes a plurality of call control processes and an inter-site connection process. Each call control process accommodates up to 100 communication terminals 4, and the inter-site connection process connects the call control processes; and thus voice communication between the communication terminals 4 accommodated by the call control process is enabled. The number of communication terminals 4 held (to be accommodated) by the client B is large (exceeds 100), and therefore two call control processes B1 and B2 are executed, and an inter-site connection process Br is further executed for connecting the call control processes B1 and B2. Consequently, voice communication between all communication terminals 4 belonging to the client B is achieved.

As illustrated in FIG. 4, the call control processes A and B for the clients A and B are provided with redundancy but the call control process C for the client C is not provided with redundancy. Redundancy of a call control process executed by the call control server 21 with redundant hardware can be set on a per process basis. Redundancy of each process may be determined based on a hardware resource, a degree of importance of the process, and the like.

The provisioning server 22 is a server for transmitting provisioning data as illustrated in FIG. 12 to a communication terminal 4. A communication terminal 4 accesses the provisioning server 22 when the power to the communication terminal 4 is turned on and receives provisioning data illustrated in FIG. 12. The communication terminal 4 sets up an operation of the communication terminal 4, based on the received provisioning data, and then can access a call control process for a client to which the communication terminal 4 belongs. Provisioning is described in detail in International Publication No. WO 2017/086416.

The call control server 21-1 and the provisioning server 22-1, and the call control server 21-2 and the provisioning server 22-2 do not necessarily have the same performance, and the numbers of settable partitions do not need to be the same either.

Processes executed by the call control server 21-1 out of the call control processes A and B being provided with redundancy and being executed by both the call control server 21-1 and the call control server 21-2 actually perform call control processing of relaying voice communications between communication terminals 4 as active processes. Each process executed by the call control server 21-2 stands by as a standby process for replacing a relating active process (the same process being executed by the call control server 21-1) in case of the active process going down. An operation mode (active process/standby process) of each process is stored in the management table 310 (see FIG. 9) in the management server 20.

Both the provisioning server 22-1 and the provisioning server 22-2 are set to an active mode and respond to provisioning requests from communication terminals 4.

FIG. 5 illustrates a connection relation between each call control process and each communication terminal 4 during normal operation, in other words, when every process is executed normally. Communication terminals 4 held by each client include a communication terminal 4 being set with a SIM for the first communication carrier and accessing the server system 2 through the LTE network 3-1 and a communication terminal 4 being set with a SIM for the second communication carrier and accessing the server system 2 through the LTE network 3-2. The call control processes A, B1, B2, and C in the call control server 21-1 being the main server operate and perform the call control processing during normal operation, and therefore every communication terminal 4 is connected to a process in the call control server 21-1. The call control server 21-1 is connected to the LTE network 3-1 side, and therefore a communication terminal 4 connected to the LTE network 3-2 accesses the call control server 21-1 from the LTE network 3-2 through the VPN 6. A multi-carrier communication terminal 4 being set with both a SIM for the first communication carrier and a SIM for the second communication carrier and being capable of accessing the server system 2 through either one of the LTE network 3-1 and the LTE network 3-2 may be provided.

Figure 6A:
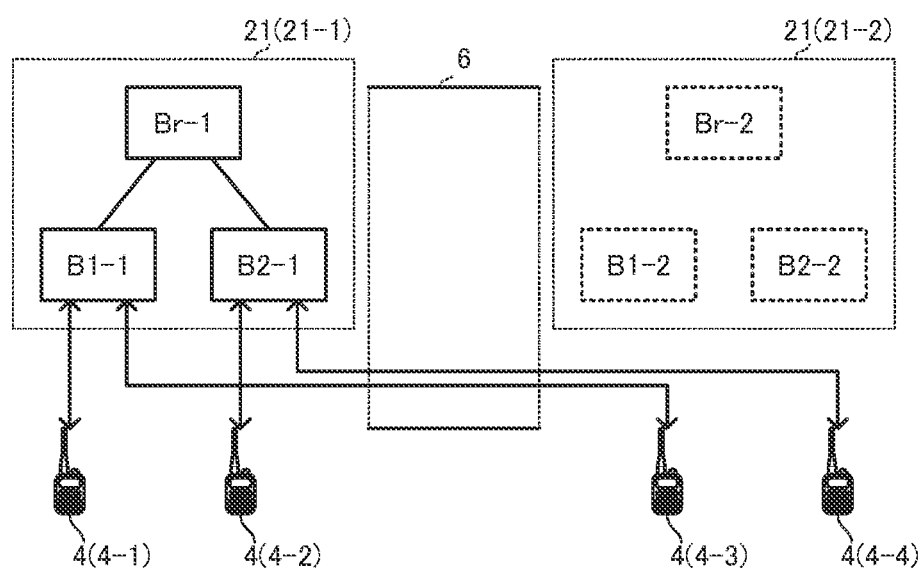
FIG. 6A is a diagram illustrating a topology between processes and communication terminals when each process is operating normally.
Figure 6B:
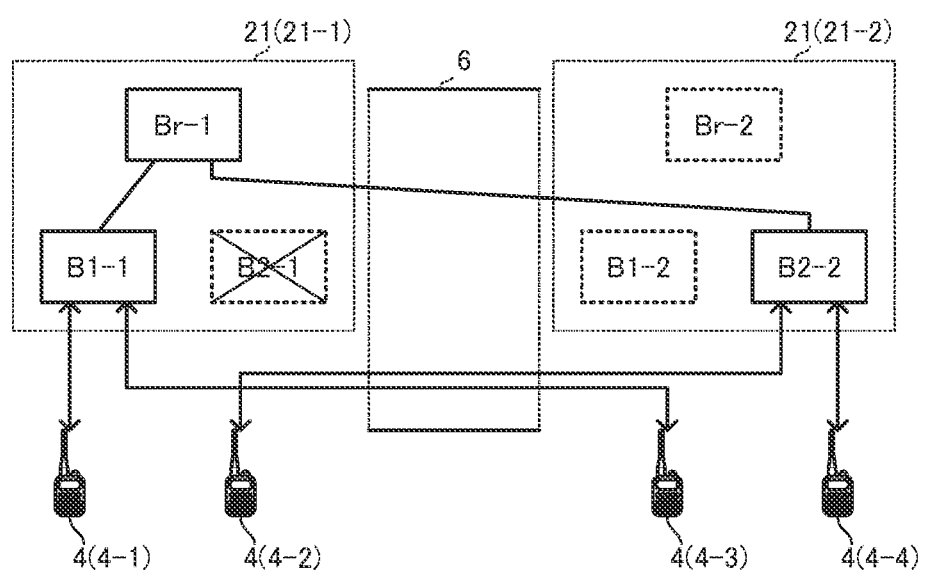
FIG. 6B is a diagram illustrating a topology between the processes and the communication terminals when part of the processes goes down.
Figure 6C:
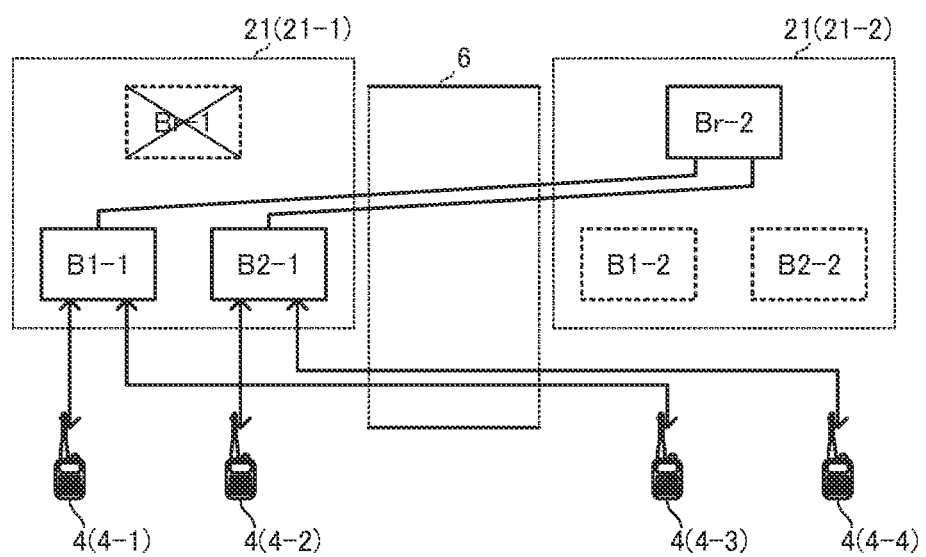
FIG. 6C is a diagram illustrating a topology between the processes and the communication terminals when part of the processes goes down.

When any process in the call control server 21-1 goes down during normal operation, the process being down is switched to a standby process in the call control server 21-2 in a topology as illustrated in FIG. 6B or FIG. 6C. In FIGS. 6A to 6C, switching from an active process to a standby process in the call control process B (the call control processes B1 and B2, and the inter-site connection process Br) for the client B will be described.

FIG. 6A illustrates a topology between processes and communication terminals 4 in a case of each process for the client B being executed normally. The topology is the same as that illustrated in FIG. 5. In this diagram, the call control processes B1-1 and B2-1, and the inter-site connection process Br-1 are in operation, and the communication terminals 4 access the call control processes B1-1 and B2-1. Specifically, a communication terminal 4-1 accesses the call control process B1-1 through the LTE network 3-1, and a communication terminal 4-3 accesses the call control process B1-1 through the LTE network 3-2 and the VPN 6. A communication terminal 4-2 accesses the call control process B2-1 through the LTE network 3-1, and a communication terminal 4-4 accesses the call control process B2-1 through the LTE network 3-2 and the VPN 6.

FIG. 6B illustrates a topology in a case of the call control process B2-1 going down. Since the call control process B2-1 being an active process is down, the call control process B2-2 being a relating standby process becomes an active process. Then, the communication terminals 4-2 and 4-4 change the access destination from the call control process B2-1 to the call control process B2-2. Specifically, the communication terminal 4-2 accesses the call control process B2-2 through the LTE network 3-1 and the VPN 6, and the communication terminal 4-4 accesses the call control process B2-2 through the LTE network 3-2. Further, the inter-site connection process Br-1 switches the connected sites in such a way that the main call control process B1-1 is connected to the sub-call control process B2-2.

FIG. 6C illustrates a topology in a case of the inter-site connection process Br-1 going down. Since the inter-site connection process Br-1 being an active process is down, the inter-site connection process Br-2 being a standby process becomes an active process. Since the call control processes B1-1 and B2-1 in the call control server 21-1 operate normally, the inter-site connection process Br-2 connects the call control processes B1-1 and B2-1 in the call control server 21-1 through the VPN 6. Since the call control processes B1-1 and B2-1 operate normally, similarly to during normal operation, the access destinations of the communication terminals 4-1 to 4-4 do not change.

Thus, when a plurality of processes (virtual servers) operates in the call control servers 21-1 and 21-2 as hardware, and any process goes down, the process in the call control server 21-1 is switched to a process in the call control server 21-2 on a per process basis.

Each process includes a status table as illustrated in FIGS. 7A and 7B in the storage 31 in order to store states of a process executed by the process and a relating counterpart process. The status table includes a storage area for a name, an operation setting, and an operation mode (active mode/standby mode) of a process executed by the process, an operation notification expiration date and time of the process, and an operation notification expiration date and time of an active process. Setting information being one of a main process (main), a sub-process (sub), and a stand-alone process (alone) is stored in the operation setting field. When the same processes are executed by the call control server 21-1 and the call control server 21-2, one of the processes is set to a main process, and the other is set to a sub-process. In general, a process executed by the call control server 21-1 being a main server is set to a main process, and a process executed by the call control server 21-2 being a sub-server is set to a sub-process. When both processes are operating normally, the main process enters the active mode executing actual processing, and the sub-process enters a standby mode. When the main process goes down, the sub-process enters the active mode. Whether the operation mode of the process is the active mode or the standby mode is stored in the operation mode field.

Since the call control process C is executed only by the call control server 21-1, the stand-alone process is stored in the operation setting field.

An operation notification transmitted by each process to the management server 20 and a relating standby process includes a name, an operation setting, and an operation mode of a process executed by the process, and an expiration date and time of the operation notification.

FIG. 7A is a diagram describing an example of stored contents in a status table in a main process. In this example, the process executes the call control process B2-1; and the operation setting is main, and the operation mode is the active mode. An expiration date and time of an operation notification sent by the process to the management server 20 and a counterpart sub-process is stored in an operation notification expiration date and time field. An operation notification is a message notifying that a process is operating normally to the management server 20 and a standby process, by the process. By an operation notification with a new expiration date and time being sent before the expiration date and time of the operation notification is passed, the standby process and the management server 20 confirm that the active process is operating normally. An expiration date and time of an operation notification received from a relating active process is stored in an active process operation notification expiration date and time field when the process is on standby. Since FIG. 7A is a status table of an active process, the active process operation notification expiration date and time field received from an active process is blank.

FIG. 7B is a diagram describing an example of stored contents of a status table in a sub-process. In this example, the process executes the call control process B2-2; and the operation setting is the sub-process, and the operation mode is the standby mode. An expiration date and time of an operation notification sent by the process to the management server 20 is stored in the operation notification expiration date and time field. An expiration date and time of an operation notification sent from a relating active process (call control process B2-1) is stored in the active process operation notification expiration date and time field. When an operation notification with a new expiration date and time is sent before the expiration date and time is passed, the table is updated by the new expiration date and time, and the standby mode is continued.

When an operation notification is not sent from the active process after the expiration date and time is passed, the sub-process determines that the main process being the active process is down, switches the operation mode of the process to the active mode, and starts relaying of voice communications of communication terminals 4, as illustrated in the right-hand fields in the diagram.

Figure 8A:
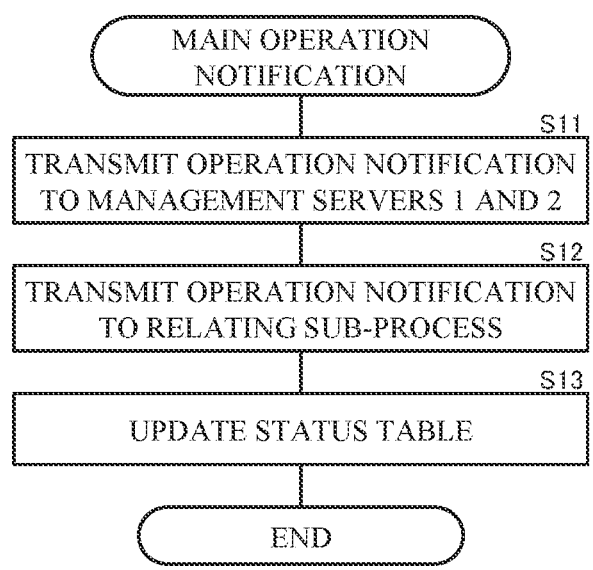
FIG. 8A is a flowchart illustrating an operation of the call control server.

FIGS. 8A to 8D are flowcharts illustrating operations of a call control process executed by the call control server 21. FIG. 8A illustrates operation notification processing of an active process. An active process periodically (for example, every minute) transmits an operation notification to the management servers 20-1 and 20-2 on both sides (S11) and also transmits an operation notification to a relating standby process (S12). The expiration date and time of the transmitted operation notification is set later than the next scheduled transmission time. The active process updates the expiration date and time of an operation notification in the status table of the active process to the expiration date and time described above (S13).

FIG. 8B illustrates operating status confirmation processing executed by an active process and a standby process. The processing is periodically executed also. Active processes include an active process connected to another process. For example, being connected to another process refers to a state in which the call control process B1 and the inter-site connection process Br, and the call control process B2 and the inter-site connection process Br illustrated in FIG. 5 and FIGS. 6A to 6C are respectively connected. When a process is connected to another process in such a topology, the process performs processing such as switching a connection destination of the process according to operating status of the other process. The process inquires of the management server 20 about operating status of each process at every predetermined time (S16). When operating status of each process is returned from the management server 20 in response to the inquiry (S17), the process determines whether there is a change in operating status of a connection destination, such as a process in the connection destination being down and a standby process being switched to an active process (S18). When there is a change in the operating status of the connection destination (YES in S18), the process switches the connection destination according to the current operating status (S19) and ends the processing. When the process is not connected to another process or there is no change in the connection destination (NO in S18), the process ends the operating status confirmation processing.

For example, in a case that the call control process B2-1 goes down as illustrated in FIG. 6B, the inter-site connection process Br-1 recognizes that the call control process B2-1 is down, and the call control process B2-2 being a standby process thereof has started operation when inquiring of the management server 20-1 about operating status. Then, by starting interprocess communication with the call control process B2-2, the inter-site connection process Br-1 maintains the operation of the call control process B.

The inquiry to the management server 20 in FIG. 8B is made to a management server 20 on the same side, that is, a management server 20 installed in the server system 2-1 or 2-2 being the same as the server system in which the call control server 21 by which the process is executed is installed. When the management server 20 does not respond to the inquiry, the process makes an inquiry again to a management server 20 on the opposite side. The management server 20 on the opposite side refers to a management server 20 installed in the server system 2-1 or 2-2 being different from the server system in which the call control server 21 by which the process is executed is installed.

While an inquiry to the management server 20 may be made at fixed time intervals, operating status (communication counterpart) of each process may be inquired of the management server 20 every time a change in interprocess communication or switching of the operation mode in the standby process (see FIG. 8D) occurs.

Figure 8C:
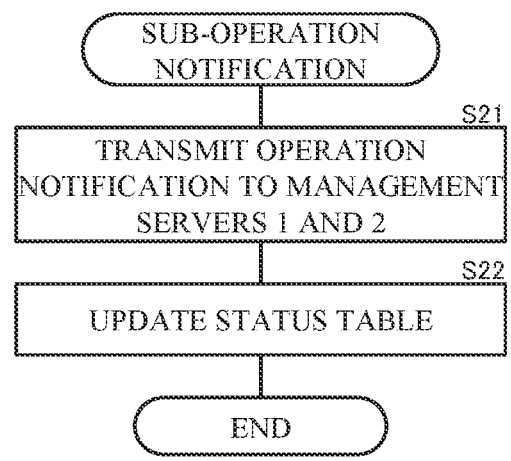
FIG. 8C is a flowchart illustrating an operation of the call control server.

FIG. 8C illustrates operation notification processing of a standby process. A standby process periodically (for example, every minute) transmits an operation notification to the management servers 20-1 and 20-2 on both sides (S21). The expiration date and time of the transmitted operation notification is set later than the next scheduled transmission time. The standby process updates the expiration date and time of an operation notification in the status table of the standby process to the expiration date and time described above (S22).

FIG. 8D illustrates operating status confirmation processing of a standby process. The processing is periodically executed also. A standby process determines whether an operation notification from an active process is valid with reference to the status table (S24). When the expiration date and time of the operation notification from the active process is passed (NO in S24), the standby process determines that the active process is down. The standby process sets connection destinations and the like according to the operating status of each process acquired in the processing in FIG. 8B and starts operation as an active process in place of the active process (main process) being down (S25). The new active process rewrites the operation mode in the status table to the active mode (S26). For example, when the inter-site connection process Br-1 goes down as illustrated in FIG. 6C, the inter-site connection process Br-2 starts an operation of performing interprocess communication with the call control processes B1-1 and B2-1 in operation.

After starting to operate as an active process, the new active process notifies the management server 20 that the operation mode is changed (S27). The operation mode change notification also serves as an operation notification. On the other hand, when the active process is normally operating in S24, in other words, when the expiration date and time of the operation notification is not passed (YES in S24), the standby process ends the operating status confirmation processing.

FIG. 9 is a diagram illustrating an example of the management table 310 set in the management server 20. FIG. 9 only describes parts related to processes in the call control servers 21-1 and 21-2 in the management table 310. A similar table is provided for each process in the provisioning servers 22-1 and 22-2.

The management table 310 stores information about every process executed by the (first) call control server 21-1 being a main server and the (second) call control server 21-2 being a sub-server. The management table 310 stores an operation notification expiration date and time, an operation setting, and an operation mode for each process. An expiration date and time described in an operation notification sent from a process is stored in the operation notification expiration date and time field. When the management server 20 receives a new operation notification from the process at or before the expiration date and time, the expiration date and time is updated to an expiration date and time described in the new operation notification. Setting information about either one of a main process and a sub-process is stored in the operation setting field. Either one of the active mode and the standby mode is stored in the operation mode field.

When a new operation notification is not sent from each process at or before the operation notification expiration date and time, the management server 20 determines that the process is down (a function to transmit an operation notification is lost) and rewrites the operation mode to down. Since an inquiry about operating status of every process is periodically made by a normally operating process, the management server 20 returns information such as a normally operating process, a process on normal stand by, and a process being down, in response to the inquiry. Each process makes switching of a connection destination and the like, based on the operating status. Further, when receiving a notification of a start of operation from a process starting operation in response to an active process going down, the management server 20 rewrites the operation mode of the process in the management table 310 to the active mode.

An area for storing connection destination processes being communication counterparts with respect to processes performing interprocess communication (such as the call control processes B1-1, B1-2, and the inter-site connection process Br-1) may be provided in the management table 310.

Figure 10A:
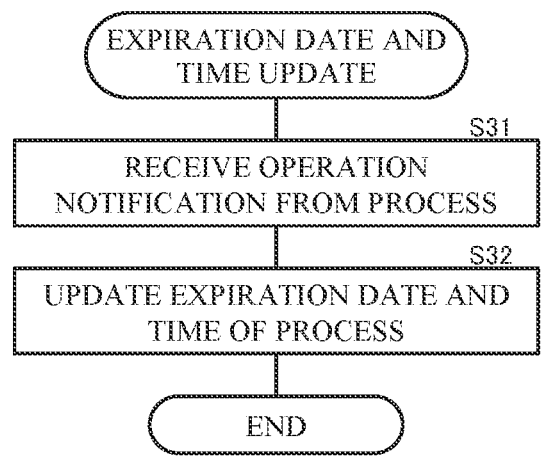
FIG. 10A is a flowchart illustrating an operation of the management server.

FIGS. 10A to 10E are flowcharts illustrating operations of the management server 20. FIG. 10A is a flowchart illustrating an expiration date and time update operation. When receiving an operation notification from any process (S31), the management server 20 updates the operation notification expiration date and time of the process in the management table 310 (S32). When a process is started and transmits an operation notification for the first time, the management server 20 registers the process in the management table 310 and writes an operation notification expiration date and time.

Figure 10B:
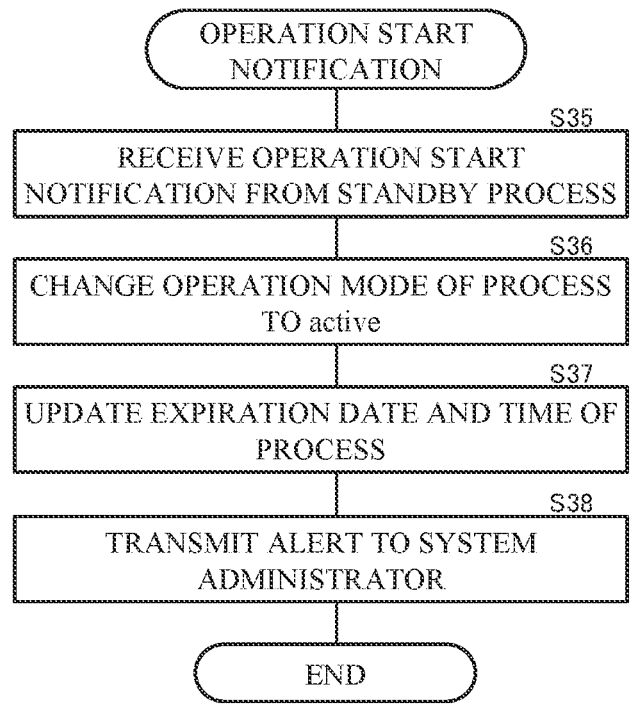
FIG. 10B is a flowchart illustrating an operation of the management server.

FIG. 10B is a flowchart illustrating an operation when an operation start notification is received from a process. When receiving a notification of a start of operation from a standby process (in place of an active process going down) (S35: see S27 in FIG. 8D), the management server 20 changes the operation mode of the process in the management table 310 to the active mode (S36). Since the operation start notification also serves as an operation notification, the management server 20 updates the operation notification expiration date and time of the process (S37). The management server 20 transmits an alert that the active process is changed, to a terminal (personal computer) of a system administrator by mail or the like (S38).

Figure 10C:
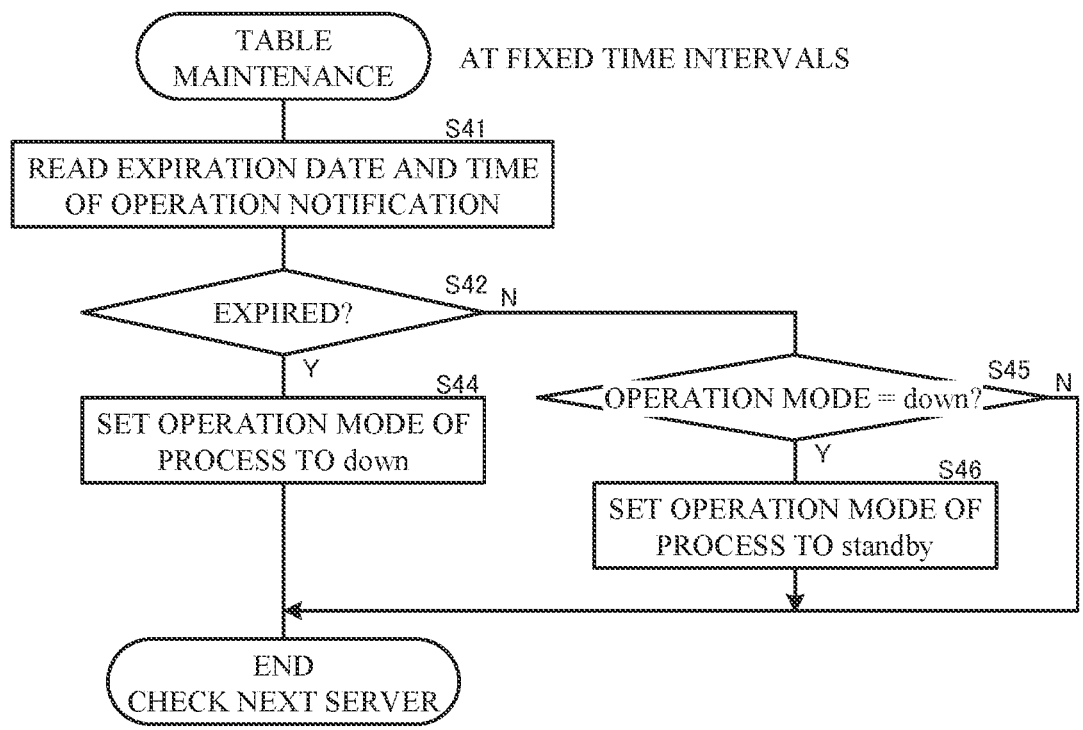
FIG. 10C is a flowchart illustrating an operation of the management server.

FIG. 10C is a flowchart illustrating a table maintenance operation. The following processing is executed on every process periodically stored in the management table 310. The management server 20 reads an expiration date and time of an operation notification of a process (S41). The management server 20 compares the expiration date and time with the current time and when the expiration date and time is passed (YES in S42), rewrites the operation mode to down (S44). The management server 20 executes the operation on every process stored in the management table 310. While rewriting of the operation mode to down is performed even when a down state is continuing and the operation mode is already rewritten to down in S44, rewriting may not be performed when the operation mode is already the down mode.

When the expiration date and time of the operation notification is not passed (NO in S42), the management server 20 determines whether the current operation mode is down (S45). When the operation mode is down (YES in S45), the management server 20 rewrites the operation mode to the standby mode (S46). When the expiration date and time of the operation notification is not passed (NO in S42) and the operation mode is not down (NO in S45), the management server 20 ends the maintenance processing on the process. The management server 20 successively executes the maintenance processing from S41 to S46 on every process stored in the management table 310.

As described in S46, when a process once going down recovers, the process operates as a standby process in preparation for the currently active process going down. When a process the operation setting of which is set to a main process recovers, the main process may return to the active process, and a sub-process operating as an active process until then may switch to the standby mode.

FIG. 11A is a diagram describing stored contents of the management table 310 when the call control processes of the client B enter the state in FIG. 6B. FIG. 11B is a diagram describing stored contents of the management table 310 when the call control processes of the client B enter the state in FIG. 6C. In the diagrams, only the operation mode field of each process is indicated. In the state in FIG. 6B, the call control process B2-1 is down, and the call control process B2-2 is operating instead. In this case, the operation mode of the call control process B2-1 is rewritten to down also in the management table 310 illustrated in FIG. 11A, and the operation mode of the call control process B2-2 is the active mode instead.

In the state in FIG. 6C, the inter-site connection process Br-1 in the call control server 21-1 is down, and the inter-site connection process Br-2 in the call control server 21-2 is operating instead. In this case, the operation mode of the inter-site connection process Br-1 is rewritten to down also in the management table 310 illustrated in FIG. 11B, and the operation mode of the inter-site connection process Br-2 is the active mode instead.

Thus, the management server 20 updates the management table 310 according to a change in the operation mode of each process and transmits the contents of the table in response to an inquiry from another process or the communication terminal 4. The above allows a process to recognize a state of another process and facilitates a change of a connection destination of interprocess communication and a change of a call control process to be accessed by a communication terminal 4.

The management server 20 also functions as a web server. The contents of the management table 310, an update history thereof, and the like can be displayed on a personal computer of a manager through the LAN 5 or the LTE network 3.

Figure 10D:
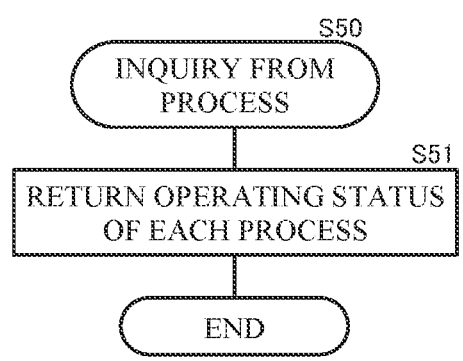
FIG. 10D is a flowchart illustrating an operation of the management server.

FIG. 10D is a flowchart illustrating processing of the management server 20 responding to an inquiry from a process. When an inquiry about operating status is made by a process (S50: see S16 in FIG. 8B and S25 in FIG. 8D), the management server 20 transmits operating status of each process (contents of the management table 310) to the process making the inquiry (S51). Consequently, the process can recognize operating status of other processes.

Figure 10E:
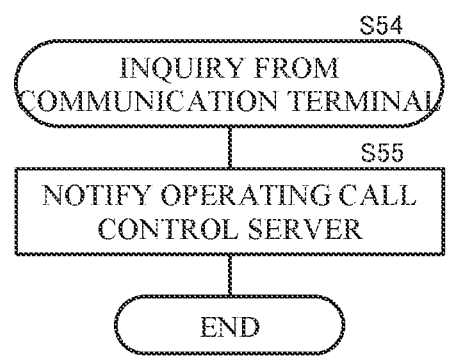
FIG. 10E is a flowchart illustrating an operation of the management server.

FIG. 10E is a flowchart illustrating processing of the management server 20 responding to an inquiry from a communication terminal 4. When an inquiry about an active call control process is made by a communication terminal 4 (S54), the management server 20 notifies a call control process on the operating side out of call control processes of a client to which the communication terminal 4 belongs (S55). Consequently, when the operating call control process goes down and the active call control process is switched, the communication terminal 4 can access the switched call control process.

FIG. 12 is a diagram illustrating an example of provisioning data 41 stored in a memory in the communication terminal 4. The provisioning data 41 include a main provisioning server address, a sub-provisioning server address, a main call control server address, a sub-call control server address, and various types of setting information.

The main provisioning server address includes an IP address and a port number of the provisioning server 22-1. The sub-provisioning server address includes an IP address and a port number of the provisioning server 22-2. The addresses may be given by the provisioning server 22 or may be stored in the communication terminal 4 in advance.

The main call control server address includes an IP address of the call control server 21-1 and a port number of a process of a client to which the communication terminal 4 belongs. The sub-call control server address includes an IP address of the provisioning server 22-2 and a port number of a process of a client to which the communication terminal 4 belongs. An active flag indicating an address of an active process is provided for each of the main provisioning server address, the sub-provisioning server address, the main call control server address, and the sub-call control server address. An active flag is set to each of the main provisioning server address and the main call control server address by default.

For example, various types of setting information include a calling ID of a communication terminal 4, a ringtone setting (selection information about a ringtone of an incoming call), an earphone setting (setting information about whether full-duplex communication is performed when an earphone-microphone is connected), an address book (a calling ID list of callable communication terminals 4), and a sound volume setting (sound volume setting information about a telephone conversation sound).

Figure 13A:
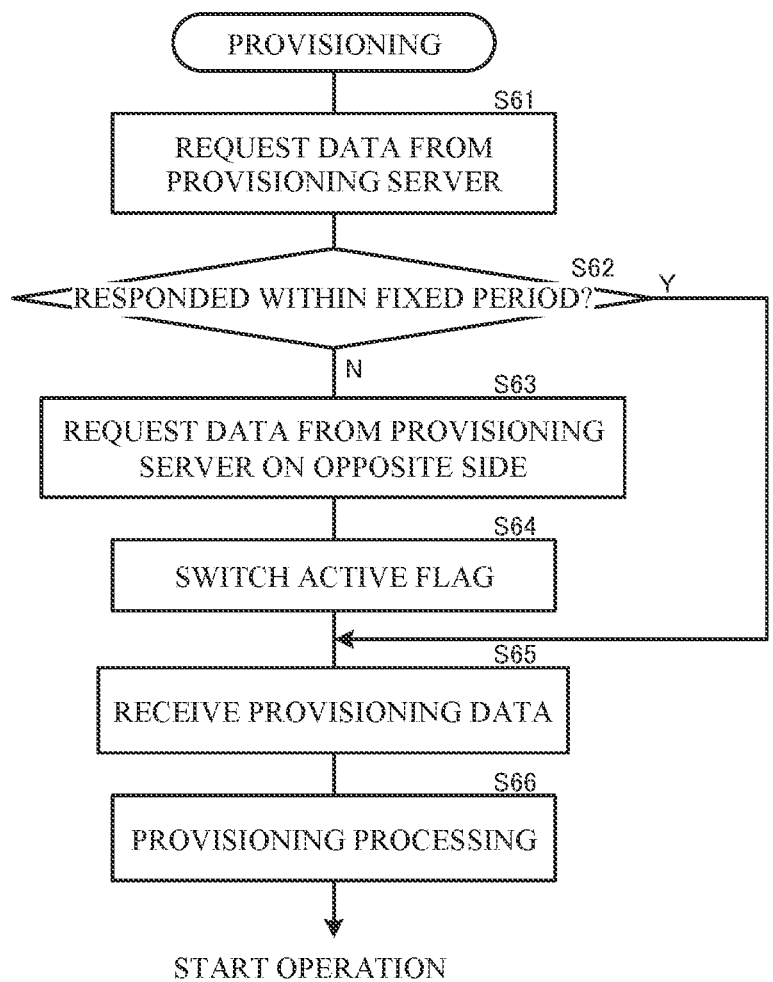
FIG. 13A is a flowchart illustrating an operation of the communication terminal.
Figure 13B:
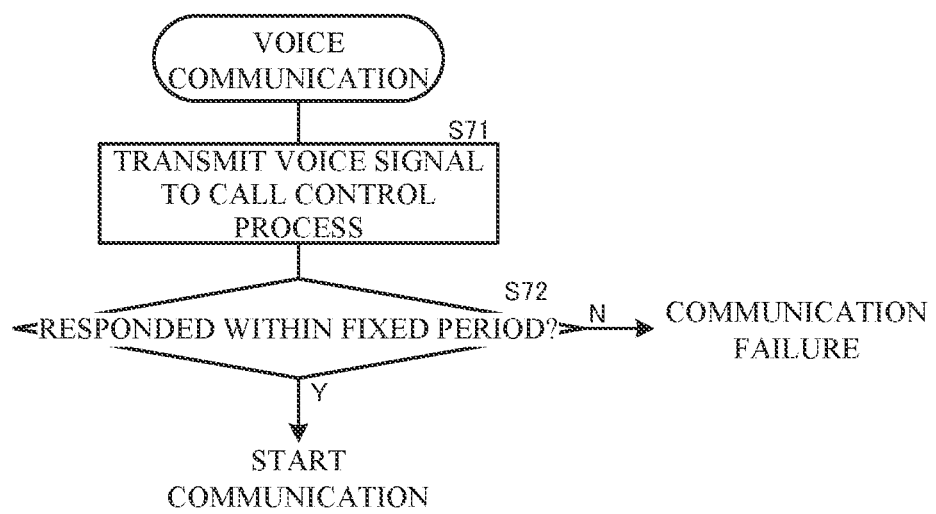
FIG. 13B is a flowchart illustrating an operation of the communication terminal.

FIGS. 13A to 13C are flowcharts illustrating operations of a communication terminal 4. FIG. 13A is a flowchart illustrating a provisioning operation. The operation is executed when, for example, the power to a communication terminal 4 is turned on. The controller 40 in the communication terminal 4 accesses the provisioning server 22-1 being a main server and requests transmission of provisioning data (S61). When the provisioning server 22-1 responds within a fixed period (YES in S62), the communication terminal 4 receives provisioning data from the server (S65) and executes provisioning (S66). When the provisioning server 22-1 does not respond within the fixed period (NO in S62), the communication terminal 4 accesses the provisioning server 22-2 being a sub-server, requests transmission of provisioning data (S63), and switches the active flag to the sub-provisioning server 22-2 side (S64). Then, the communication terminal 4 receives provisioning data from the sub-provisioning server 22-2 (S65). When the two provisioning servers 22-1 and 22-2 go down simultaneously, the communication terminal 4 may attempt connection by use of previously acquired provisioning data.

FIG. 13B is a flowchart illustrating an operation when a communication terminal 4 performs voice communication. The operation starts when the PTT switch 220 is pressed. The controller 40 in the communication terminal 4 transmits a voice signal to a call control process (virtual server) allocated to the communication terminal 4 in the main call control server 21-1 (S71). When the process in the call control server 21-1 responds within a fixed period (YES in S72), the communication terminal 4 starts voice communication. When the process in the call control server 21-1 does not respond within the fixed period (NO in S72), the communication terminal 4 performs display indicating a failed communication, or the like and stops the operation. The communication down state is a state that may occur when a call control process operating until then goes down and then communication is started before active process confirmation in FIG. 13C.

FIG. 13C is a flowchart illustrating an operation of a communication terminal 4 inquiring about an operating call control process. While the processing is periodically performed, the processing may be temporarily executed when a call control process determined to be active in S72 in FIG. 13B does not respond. The controller 40 in the communication terminal 4 inquires of the management server 20 about an active call control process accommodating the communication terminal 4 (S73). In response to the inquiry, information about the active process is sent from the management server 20. The communication terminal 4 receives the information (S74: see S55 in FIG. 10E) and determines whether the active process is switched (S75). When the active process is switched (YES in S75), the communication terminal 4 switches the active flag of the call control server to the active process side (sub-call control server side) (S76). From here onward, when a voice communication occurs, the communication terminal 4 accesses a call control process switched to the active process.

A communication terminal 4 transmits a message requesting registration (registration message) to a call control server 21 in the active mode at the start of operation, periodically, and at every opportunity such as movement between areas. By receiving the message, the call control server 21 in the active mode can recognize a communication terminal in operation and register the communication terminal 4 in a terminal table. When no response is returned after transmitting the registration message to the call control server 21-1 or 2 assumed to be in the active mode, the communication terminal 4 determines that the call control server 21-1 or 2 is down and transmits a registration message again to the call control server 21-2 or 1 on the opposite side.

While a communication terminal 4 periodically inquires of the management server 20 about a call control process in the active mode in the flowcharts illustrated in FIGS. 10A to 10E and FIGS. 13A to 13C, the communication terminal 4 may resolve which call control process is in the active mode, based on whether the aforementioned registration message is responded to.

When a call control process operating in the standby mode receives a registration message from a communication terminal, the call control process may return, to the communication terminal, a response urging switching of the destination of the registration message to a call control process on the opposite side (in the active mode) and retransmission of the registration message.

Determining a call control server 21 in the active mode, based on whether a registration message is responded to, can eliminate frequent inquiry to the management server 20 even when the number of communication terminals 4 is large and can lighten the load on the management server 20. However, since an interval between registrations is generally longer than an interval between inquiries described in FIG. 13C and the like, the time until a communication terminal 4 recognizes a change of a call control process in the active mode becomes longer.

Switching of call control operations when a process in the call control server 21-1 or 21-2 goes down has been described above. Even when a process is not down, the VPN 6 connecting the server system 2-1 to the server system 2-2 may go down. A degeneracy operation when the VPN 6 goes down will be described with reference to FIG. 14 and FIGS. 15A and 15B.

Figure 14:
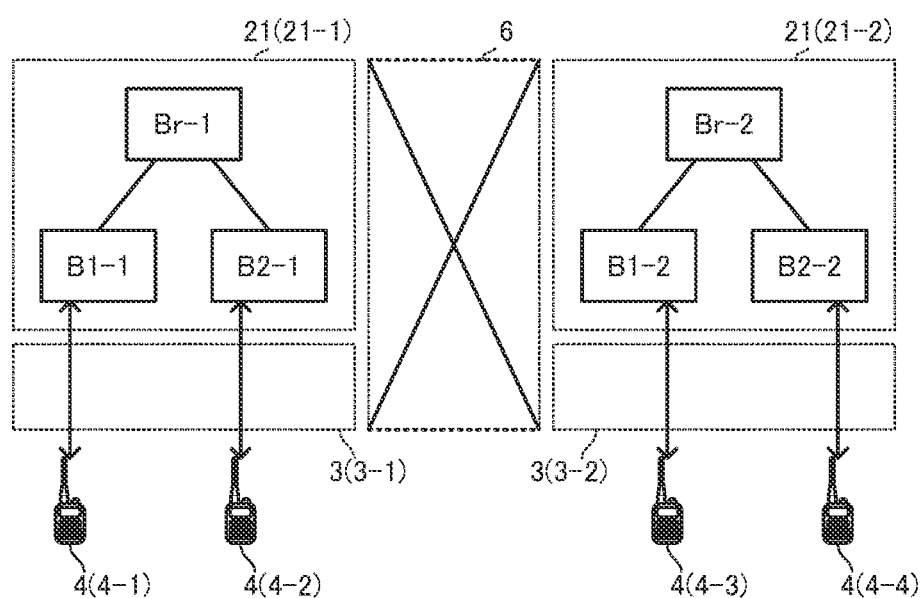
FIG. 14 is a diagram illustrating a topology between the call control processes and the terminal devices when a VPN connecting server systems goes down.

FIG. 14 illustrates a topology between processes when the VPN 6 goes down in the call control process of the client B. The management servers 20-1 and 20-2, the call control servers 21-1 and 21-2, and the provisioning servers 22-1 and 22-2 are operating normally, and the call control processes B1-1, B2-1, B1-2, and B2-2, and the inter-site connection processes Br-1 and Br-2 are also operating normally.

When the VPN 6 goes down, communication between the server systems 2-1 and 2-2 is interrupted. Even in this case, the management server 20-1, the call control server 21-1, and the provisioning server 22-1 in the server system 2-1 are operating normally, and therefore services such as the call control process B to communication terminals 4 (4-1 and 4-2) accessing the server system 2-1 through the LTE network 3-1 can be continued.

On the other hand, in the server system 2-2, the management server 20-2, the call control server 21-2, and the provisioning server 22-2 are also operating normally, and an operation notification from each process in the server system 2-1 does not arrive. Each process in the management server 20-2, the call control server 21-2, and the provisioning server 22-2 determines that every process on the server system 2-1 side is down, and each process in the call control server 21-2 and the provisioning server 22-2 switches from the standby mode to the active mode and operates call control processes for the client B. Then, a call control process launched in the call control server 21-2 provides service for communication terminals 4 (4-3 and 4-4) accessing the server system 2 through the LTE network 3-2.

Thus, when the VPN 6 goes down, communication connecting the LTE networks 3-1 and 3-2 is interrupted but the call control process B in each of the LTE networks 3-1 and 3-2 enters the active mode, and service can be provided in each range.

At this time, every process in the call control server 21-1 is set to the active mode and the operation mode of every process in the call control server 21-2 is set to down in the management table 310 in the management server 20-1 in the server system 2-1, as illustrated in FIG. 15A. On the other hand, the operation mode of every process in the call control server 21-1 is set to down and every process in the call control server 21-2 is set to the active mode in the management table 310 in the management server 20-2 in the server system 2-2, as illustrated in FIG. 15B. The call control process C is not provided with redundancy and is executed only by the call control server 21-1. Accordingly, when a communication terminal 4 of the client C is in the LTE network 3-2 area in a case of the VPN 6 going down, the communication terminal 4 cannot communicate.

The degeneracy operation is achievable by the operations of each process in the call control servers 21-1 and 21-2 illustrated in FIGS. 8A to 8D and the operations of the management servers 20-1 and 20-2 illustrated in FIGS. 10A to 10E, as an operation in response to interruption of an operation notification from a process on the other side due to the VPN 6 going down.

While operation settings are made in such a way that each process executed by the call control server 21-1 is set as a main process with the call control server 21-1 as a main server and the call control server 21-2 as a sub-server in the present embodiment, processes which are operationally set as main processes may be distributed between the call control servers 21-1 and 21-2.

While a configuration in which two each of the server systems 2 and the networks 3 are provided has been described in the aforementioned embodiment, the configuration may include third and fourth server systems and networks, and so forth. Thus, further redundancy can be provided.

As described above, even when a process being down due to a failure exists, the entire server does not need to be switched due to the process being down, and therefore an effect on other processes can be minimized, according to the present embodiment. Further, by installing the dedicated management server 20 for enabling management of operating status of each process and replying to an inquiry about the operating status, even when a failure occurs in a process, the failure can be recognized by another process and countermeasures such as switching of a destination of an interprocess communication can be taken; and thus the interprocess communication can be maintained.

REFERENCE SIGNS LIST

1 Voice communication system
2 (2-1, 2-2) Server system
20 (20-1, 20-2) Management server
21 (21-1, 21-2) Call control server
22 (22-1, 22-2) Provisioning server
3 (3-1, 3-2) LTE network
4 (4-1 to 4-4) Communication terminal

The invention claimed is:

1. A server system comprising a first server and a second server that are installed on a communication network, wherein
each of the first server and the second server is divided into a plurality of partitions and executes mutually different processes in the respective partitions,
by setting redundancy of the processes executed by the first server on a per process basis, the second server executes, in parallel, at least part of the plurality of processes executed by the first server,
among the processes executed in parallel by the first server and the second server, one process operates in an active mode for actual providing service, and another process operates in a standby mode that, when the one process in the active mode goes down, becomes the active mode in place of the one process going down,
an active process that is a process in the active mode periodically transmits an operation notification being a message notifying that the active process is operating normally, to a standby process that is a process in the standby mode,
the standby process continues the standby mode while periodically receiving an operation notification from the active process, and
when no longer receiving the operation notification from the active process, the standby process switches an operation mode of the standby process from the standby mode to the active mode and starts provision of the service.

2. The server system according to claim 1, wherein
the communication network includes a first network and a second network,
the first server is provided on the first network, and the second server is provided on the second network, and
the first server and the second server are connected by a communication line other than the communication network.

3. The server system according to claim 2, wherein
the process executed by the first server and the second server include call control processes relaying voice signals transmitted from a plurality of communication terminals, and
the plurality of communication terminals accesses the first server or the second server through either one of the first network and the second network.

4. The server system according to claim 3, wherein
the communication line is configured with a VPN,
the processes executed by the first server and the second server further include a connection process connecting the call control processes in the active mode to each other, and
when the connection process in the active mode is located in one of the first server or the second server, the connection process in the active mode connects, through the VPN, the call control processes in the active mode that are located in another of the first server or the second server.

5. The server system according to claim 4, wherein
the call control processes in the active mode are connected through the VPN to the communication terminals connected to the second network when the call control processes in the active mode are located in the first server, or connected through the VPN to the communication terminals connected to the first network when the call control processes in the active mode are located in the second server, and
when the VPN is down, the call control processes and the connection process located in each of the first server and the second server become the active mode to enable communication between the communication terminals connected to the first network and communication between the communication terminals connected to the second network.

6. The server system according to claim 1, wherein
a management server including a management table storing operating status of each process is further provided on the communication network,
each process periodically transmits the operation notification to the management server,
each process transmits, when the operation mode of the process switches from the standby mode to the active mode, a mode switch notification being a message notifying the switching, to the management server,
the management server stores operating status of each process acquired by the operation notification and the mode switch notification into the management table,
a predetermined first process and a predetermined second process out of the plurality of processes mutually execute interprocess communication, and the second process is executed in parallel by the first server and the second server,
the first process inquires of the management server about operating status of each process, the management server transmits operating status of the each process to the first process in response to the inquiry, and the first process determines a process operating in the active mode out of the second processes executed in parallel, based on received operating status of each process and determines the operating second process to be a communication counterpart in the interprocess communication.

7. The server system according to claim 6, wherein
the communication network includes a first network and a second network that are in different segments,
the first server is provided on the first network, and the second server is provided on the second network,
the management server includes a first management server provided on the first network and a second management server provided on the second network,
the first server and the first management server are connected to the second server and the second management server by a communication line different from the network,
each process transmits the operation notification and the mode switch notification to both the first management server and the second management server, and
the first process inquires of a management server on a network on the same side as the first process about operating status of each process.

8. The server system according to claim 7, wherein
the process executed by the first server and the second server include call control processes relaying voice signals transmitted from a plurality of communication terminals, and
the plurality of communication terminals accesses the first server or the second server through either one of the first network and the second network.

9. A method of providing process redundancy, the method comprising:
dividing each of a first server and a second server installed on a communication network into a plurality of partitions and executing mutually different processes in the respective partitions;
setting redundancy of the processes executed by the first server on a per process basis, and then executing, by the second server executing, in parallel, at least part of the plurality of processes executed by the first server;

by one process among the processes executed in parallel by the first server and the second server, operating in an active mode for actual providing service, and by another process, operating in a standby mode that, when the one process in the active mode goes down, becomes the active mode in place of the one process going down;

by an active process that is a process in the active mode, periodically transmitting an operation notification being a message notifying that the active process is operating normally, to a standby process that is a process in the standby mode;

by the standby process, continuing the standby mode while periodically receiving the operation notification from the active process; and by the standby process, when no longer receiving the operation notification from the active process, switching an operation mode of the standby process from the standby mode to the active mode and starting provision of the service.

10. The method according to claim 9, further comprising:
by each process, periodically transmitting the operation notification to a management server provided on the communication network;

by each process, transmitting, when the operation mode of the process switches from the standby mode to the active mode, a mode switch notification being a message notifying the switching, to the management server;

by the management server, storing operating status of each process acquired by the operation notification and the mode switch notification into a management table; and by a first process executing interprocess communication with a second process being a process executed in parallel by the first server and the second server, inquiring of the management server about operating status of each process, determining a process operating in the active mode out of the second processes executed in parallel, based on acquired operating status of each process, and determining the operating second process to be a communication counterpart in the interprocess communication.

* * * * *